(12) United States Patent
Blashford

(10) Patent No.: US 6,991,418 B1
(45) Date of Patent: Jan. 31, 2006

(54) FLIP DOOR FOR LIFTGATE WHEN USED WITH PIVOTABLE DOORS OF A TRAILER

(75) Inventor: Eric Blashford, Copley, OH (US)

(73) Assignee: Waltco Truck Equipment Co., Tallmadge, OH (US)

( * ) Notice: Subject to any disclaimer, the term of this patent is extended or adjusted under 35 U.S.C. 154(b) by 0 days.

(21) Appl. No.: 11/027,596

(22) Filed: Jan. 3, 2005

Related U.S. Application Data

(60) Provisional application No. 60/602,850, filed on Aug. 19, 2004.

(51) Int. Cl.
B60P 1/00 (2006.01)

(52) U.S. Cl. .................. 414/557; 296/57.1; 296/186.3; 296/56.09

(58) Field of Classification Search ........ 414/556–558, 414/554, 540, 467, 917, 572, 546, 491, 494, 414/498, 421, 728, 477, 478, 396, 401, 584, 414/916; 280/202; 296/50; 292/300

See application file for complete search history.

(56) References Cited

U.S. PATENT DOCUMENTS

| 3,667,635 | A | | 6/1972 | Hackney |
| 3,765,555 | A | | 10/1973 | McKenzie et al. |
| 3,797,680 | A | | 3/1974 | Dennis |
| 3,822,797 | A | | 7/1974 | McKenzie et al. |
| 3,917,085 | A | | 11/1975 | McKenzie |
| 4,046,269 | A | | 9/1977 | McKenzie |
| 4,073,393 | A | | 2/1978 | McKenzie et al. |
| 4,078,676 | A | * | 3/1978 | Mortenson ................. 414/558 |
| 4,100,740 | A | | 7/1978 | Stewart |
| 4,140,327 | A | | 2/1979 | Hackney, III |
| 4,260,312 | A | | 4/1981 | Hackney |
| 4,563,121 | A | * | 1/1986 | Drews ........................ 414/545 |
| 5,297,840 | A | * | 3/1994 | Size et al. .................... 296/50 |
| 6,183,187 | B1 | * | 2/2001 | Ablabutyan ................ 414/558 |
| 6,464,447 | B2 | * | 10/2002 | Dupuy et al. ............... 414/546 |
| 2004/0156705 | A1 | * | 8/2004 | Ablabutyan et al. ........ 414/557 |

* cited by examiner

Primary Examiner—Eileen D. Lillis
Assistant Examiner—Gregory Adams
(74) Attorney, Agent, or Firm—Roger D. Emerson; Brouse McDowell; Timothy D. Bennett

(57) ABSTRACT

A flip door or plate member for use with a trailer having pivotable doors is disclosed. The plate member is pivotable about a bed extension. The plate member pivots from an initial position where the doors may be closed and locked to a second position that where the doors may be opened. After the doors are opened, the plate member may be pivoted back to its initial position allowing a continuous bed extension.

20 Claims, 6 Drawing Sheets

FLIP DOOR FOR LIFTGATE WHEN USED WITH PIVOTABLE DOORS OF A TRAILER

This application claims priority to U.S. Ser. No. 60/602,850, entitled FLIP DOOR FOR LIFTGATE FOR USE WITH SWING DOORS OF TRAILERS, filed Aug. 19, 2004, which is incorporated herein by reference.

I. BACKGROUND OF THE INVENTION

A. Field of Invention

This invention pertains to methods and apparatuses for trailers and more specifically to improved methods and apparatuses for a bed extension to be used with trailers equipped with pivotable doors.

B. Description of the Related Art

It is well known to use various types, styles and sizes of trailers to haul a wide variety of items. One well known type of trailer is equipped with a pair of doors at the back end of the trailer that serve to provide an opening into the interior of the trailer and also serve to secure items within the trailer when closed. Generally, each door is pivoted to the body of the trailer so each door can be swung or pivoted into an open condition and a closed position. Typically, the doors swing open from the center of the trailer. Often, a lock device is provided to maintain or lock the doors into the closed position.

A known device that can be used to assist with loading trailers is a liftgate. Liftgates are generally attached to the back of a trailer and can be adjusted between a lower position, where items to be loaded onto the trailer can be positioned on a platform that is at ground level, and a raised position, where items to be loaded onto the trailer can be easily transported off of the platform that is now at trailer level and into the trailer. Most trailers equipped with a pair of pivoting doors, however, do not utilize liftgates because of difficulties related to the bed extension that bridges the space between the trailer bed and the liftgate platform. More specifically, the lock device used to lock the doors into the closed position typically includes a pair of bars, one for each door, that extend perpendicular to the ground surface and that must attach near the bottom of the doors to the trailer bed, the back bumper or, if the trailer does have a liftgate, the bed extension. This attachment may be achieved, for example, by forming a pair of holes in the trailer bed, bumper or bed extension that receive the bars. In trailers that utilize a liftgate, the bars must be lifted out of the holes in the bed extension and maintained above the bed extension before the doors can be swung open. This work of maintaining the bars above the bed extension for the entire width of the bed extension is very cumbersome.

With reference now to FIG. 2, a cutaway partial view of the back end of a prior art trailer 1 is shown. This prior art trailer includes a bed extension 30 that attempts to solve the problem noted above. The trailer 1 includes a payload section 2 and the bed extension 30 that extends outward from the trailer bed 29. The bed extension 30 connects the trailer bed 29 to the platform 34 of the liftgate when the platform 34 is in a raised position. Thus, the bed extension 30 provides a continuous surface from the trailer bed 29 to the platform 34. The bed extension 30 has a pair of slots 31, 33 to allow for the locking bars (not shown) to travel through when the doors are being opened. In this way, it is not necessary to maintain the bars above the bed extension 30 over the entire bed extension width. In order to work properly, these slots 31, 32 must be wide enough to receive the full diameter (or width) of the locking bars. However, slots of that width and length create another problem. The problem created is related to the fact that it is very common to use a dolly, cart, or other wheeled transport device when transporting items into or out of the trailer 1. The wheels of the transport device are likely to get lodged or "stuck" within the slots 31, 32 or at least knocked of line when they contact the slots 31, 32. This is very cumbersome for the operator and requires an additional expenditure of time for loading and unloading the trailer 1.

What is needed is a device and method that permits the use of a liftgate and the use of a wheeled transport device without the problems noted above. This invention provides a solution with a flip door used in association with a liftgate and a trailer.

II. SUMMARY OF THE INVENTION

According to one aspect of this invention, a trailer system may include a trailer having (1) a trailer bed; (2) at least a first door pivotally attached to the trailer; and, (3) at least a first lock member operatively connected to the first door for use in preventing the first door from pivoting. The trailer system may also include a bed extension secured to the trailer and a plate member pivotably attached to the bed extension. The plate member may be selectively pivotable into: (1) a first position A where the plate member is contiguous with the bed extension and where the plate member selectively receives the first lock member; and, (2) a second position B where the plate member is not contiguous with the bed extension and the first door can be pivoted into a closed position without the first lock member interfering with the plate member.

According to another aspect of this invention, the trailer system may also include a second door pivotally attached to the trailer and a second lock member operatively connected to the second door for use in preventing the second door from pivoting. In addition, the trailer system may include a liftgate having a platform that is selectively positionable to form a continuous surface with the bed extension and the trailer bed.

According to still another aspect of this invention, a method is provided and may, in one embodiment, include the following steps: (1) providing a trailer having a trailer bed, first and second doors pivotally attached to the trailer and first and second lock member operatively connected to the first and second doors for use in preventing the first and second doors from pivoting; (2) providing a bed extension secured to the trailer and extending from the trailer bed, the bed extension including a plate member pivotably attached to the bed extension; (3) unlocking the first and second lock members; (4) pivoting the plate member from a first position A where the plate member is contiguous with the bed extension to a second position B; (5) pivoting the first and second doors into an open position; (6) pivoting the plate member from the second position B to the first position A; (7) loading or unloading the trailer; (8) pivoting the plate member from the first position A to the second position B; (9) pivoting the first and second doors into a closed position; and, (10) pivoting the plate member from the second position B to the first position A.

III. DESCRIPTION OF THE DRAWINGS

IV. DESCRIPTION OF THE PREFERRED EMBODIMENT

Figure 1:
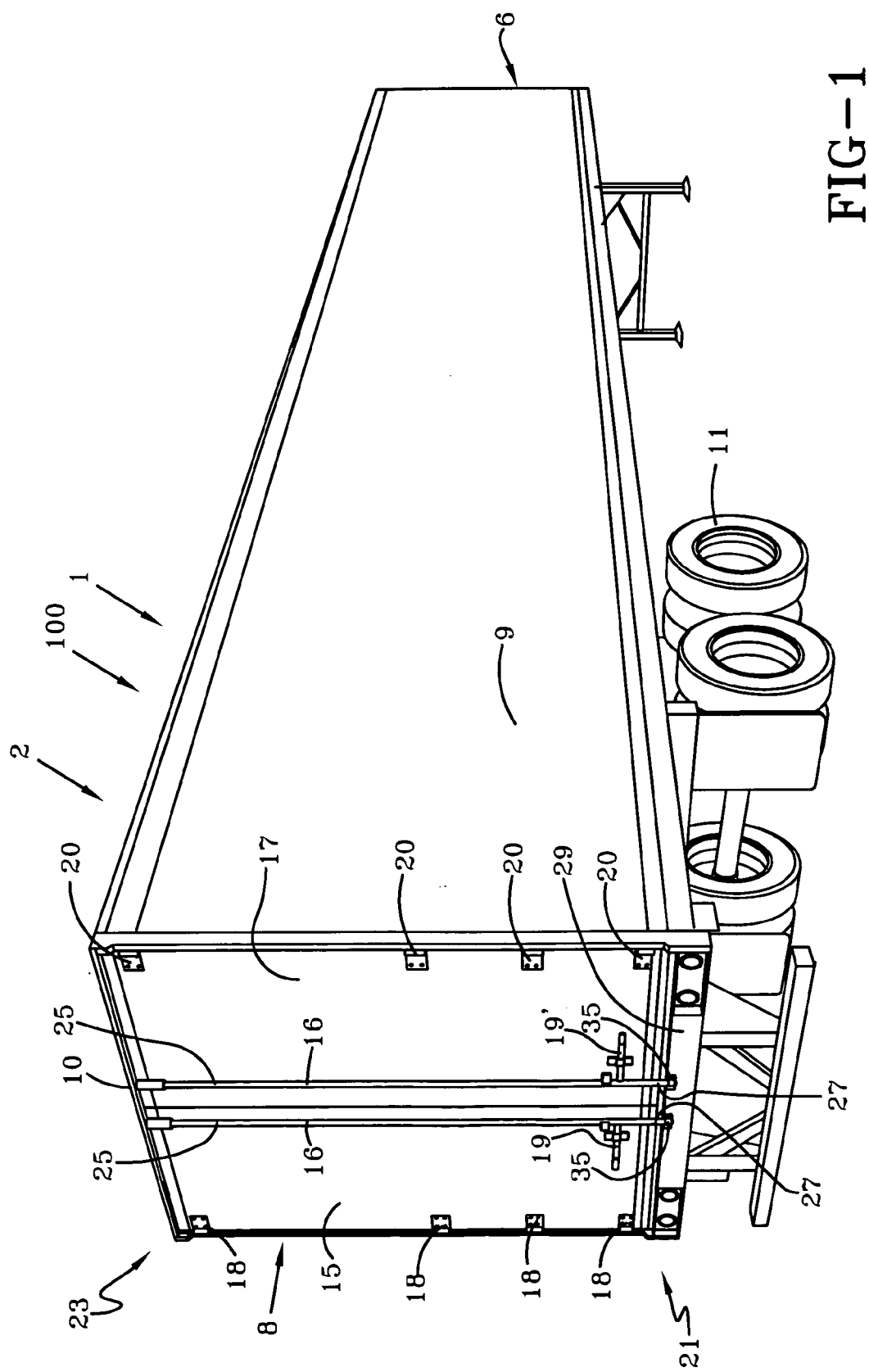
FIG. 1 is a perspective view of the back end of a trailer showing a pair of hinged doors.
Figure 2:
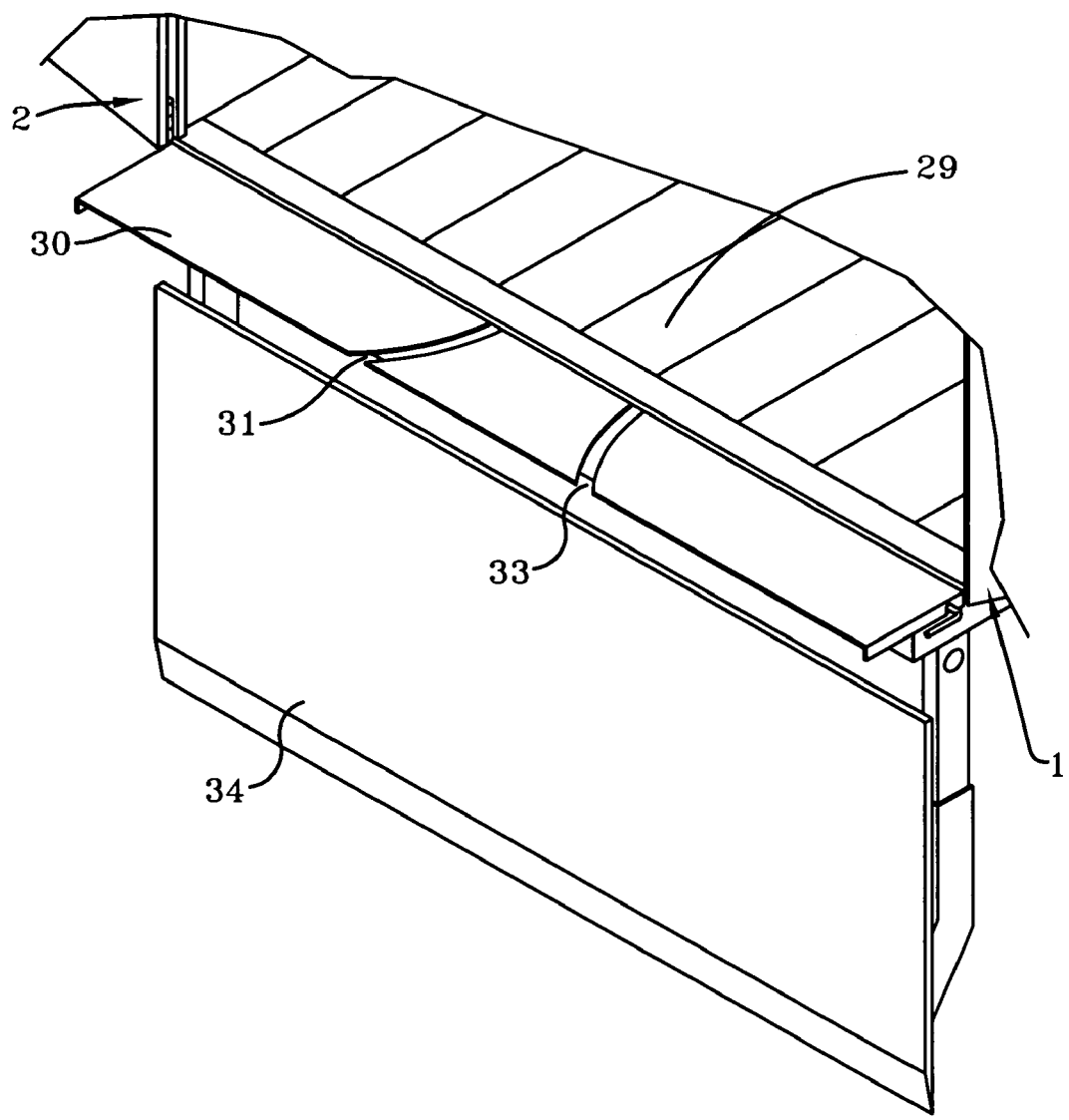
FIG. 2 is a cutaway partial view of the back end of a prior art trailer.
Figure 3:
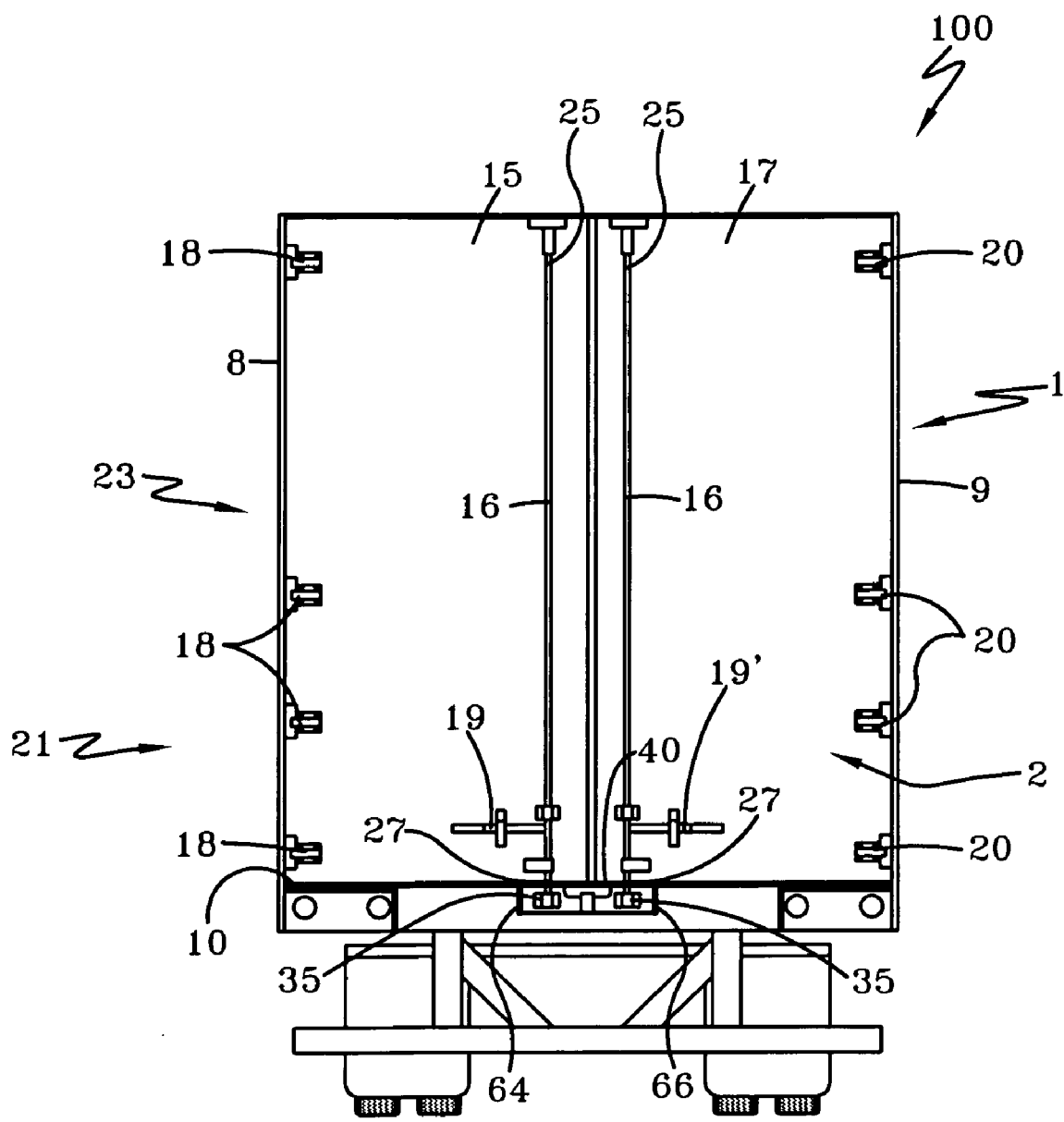
FIG. 3 is a back view of the trailer shown in FIG. 1.

Referring now to the drawings wherein the drawings are for purposes of illustrating a preferred embodiment of the invention only and not for purposes of limiting the same, FIGS. 1 and 3 show a trailer system 100 that includes a conventional trailer 1 that can be used with the flip door or plate member 40 of this invention. The trailer 1 may include a payload section 2 and may be pulled or hauled by a truck or tractor (not shown) as is well known in the art. The truck may be a separate vehicle that selectively attaches to the trailer or it may be fixedly attached to the trailer as one unit. The payload section 2 may be enclosed by a front wall 6, side walls 8, 9, a roof 10, a trailer bed (referenced 29 in FIGS. 4–6) and a set of doors 15, 17 at the back end of the trailer. The trailer 1 may include ground engaging wheels 11 of any type sufficient to handle the payload of the trailer 1. As the construction and use of a trailer 1 for carrying a given payload is well known in the art, no further explanation will be offered.

Figure 4:
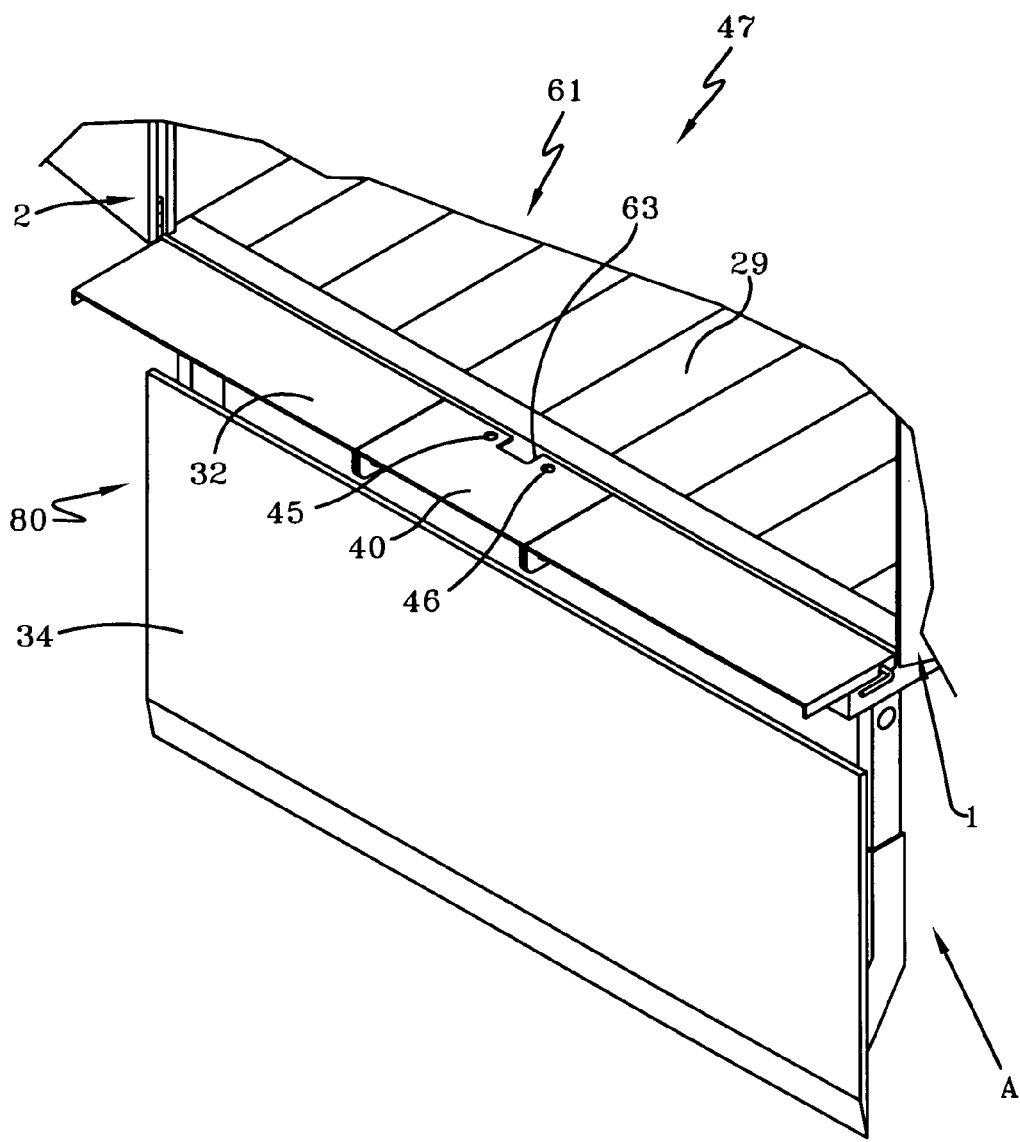
FIG. 4 is a cutaway partial view of the back end of a trailer equipped with the flip door of this invention in an up or closed position A.

With continuing reference to FIGS. 1 and 3, the doors 15, 17 are used to provide an opening into the interior of the trailer and also serve to secure items within the trailer when closed. Preferably the doors 15, 17 have hinges 18, 20 that permit the doors to be swung or pivoted open (as shown in FIG. 4) and closed (as shown in FIGS. 1 and 3) by an operator. A latching mechanism 21 may be used to help hold the doors 15, 17 in a closed position. The latching mechanism 21 may include latch rods 19, 19' as shown and known in the art or may include any other devices chosen with sound engineering judgment. It should be noted that a latching mechanism 21 is not required for this invention. It should also be noted that the particular design and operation of the doors 15, 17 can vary considerably and still be used with this invention.

Still referring to FIGS. 1 and 3, in the preferred embodiment a lock device 23 is provided to prevent the doors 15, 17 from swinging or pivoting into an open position. Most preferably the lock device 23 includes a pair of lock members, preferably lock bars 16, 16 positioned near each door, as shown. The lock bars 16, 16, when engaged, prevent the doors 15, 17 from swinging or pivoting into an open position by forming a barrier or limit that holds the doors 15, 17 in the closed position. Each lock bar 16, 16 preferably has a first end 25, 25 attached to the top of the doors 15, 17 and a second end 27, 27 that may received within respective receptacles 35, 35. The receptacles 35, 35 may be fixed to any portion of the trailer 1 chosen with sound engineering judgment. When the lock bars 16, 16 are positioned within the receptacles 35, 35 the lock device 23 acts to hold the doors 15, 17 in a closed position. The general operation of lock bars 16, 16 is known in the art and thus will not be discussed in detail.

With reference now to FIGS. 3–6, in the preferred embodiment, a bed extension 32 is provided to form a bridge between the trailer bed 29 and a platform 34 of a liftgate 80.

Figure 5:
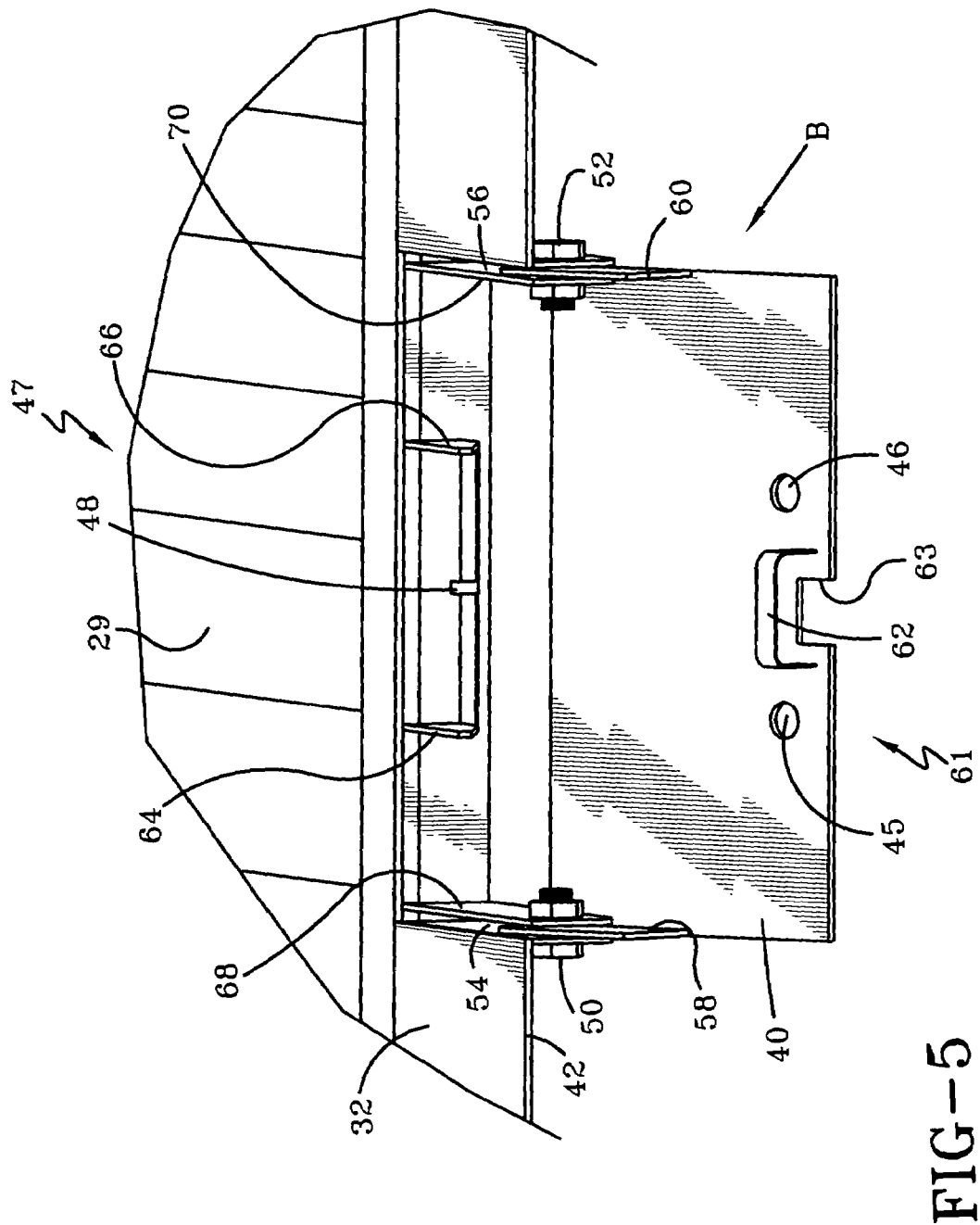
FIG. 5 is a cutaway partial close-up view showing the flip door of this invention in a down or open position B.
Figure 6:
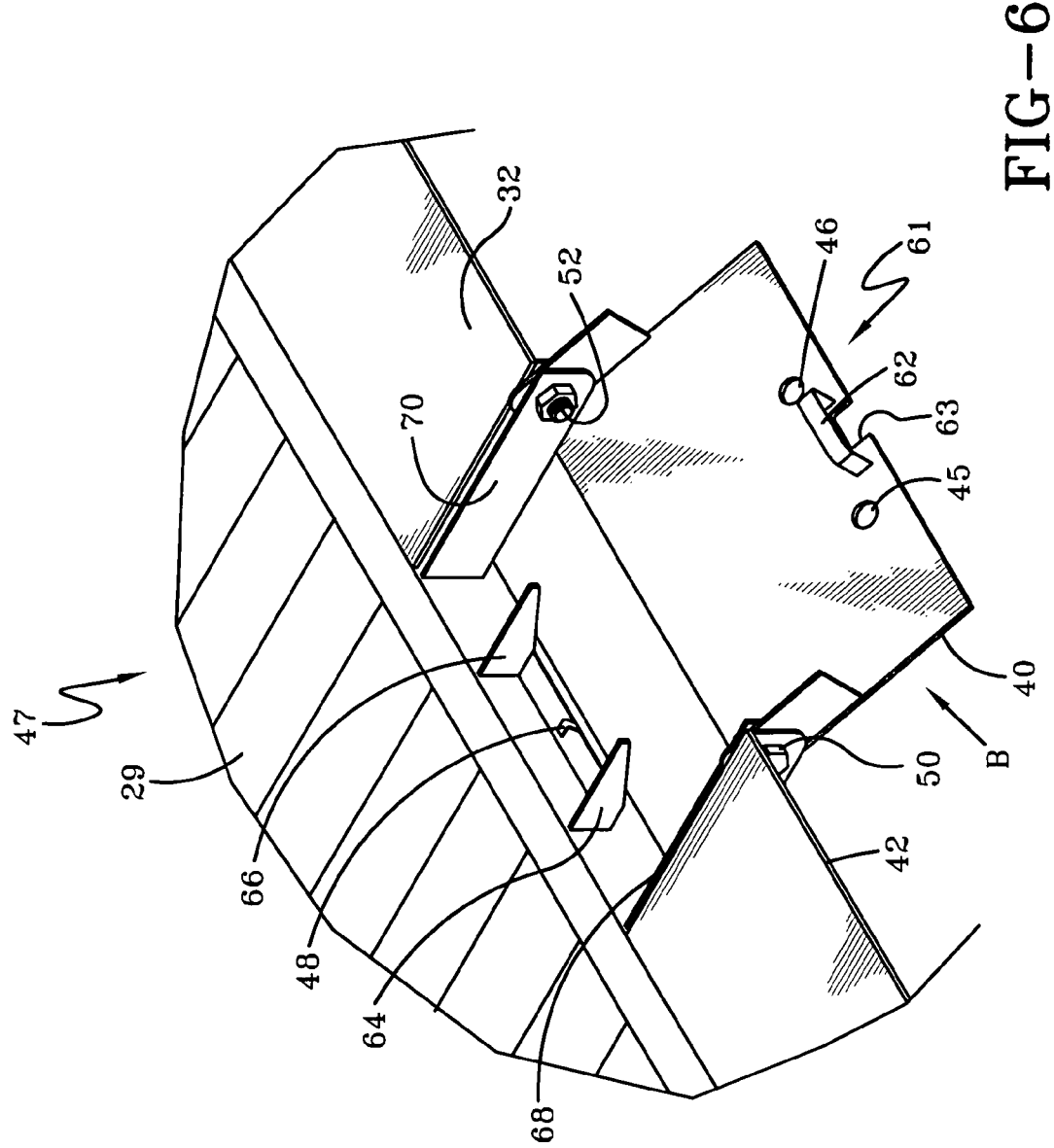
FIG. 6 is a side perspective similar to that shown in FIG. 5.

A plate member 40 is formed contiguously with the bed extension 32 as shown. Preferably the plate member 40 includes a pair of openings 45, 46 to receive the second ends 27, 27 of the lock bars 16, 16. The plate member 40 may be hinged at an outer edge 42 of the bed extension 32 so that the plate member 40 may pivot or swing into a first position A (that is contiguous with the bed extension 32 as shown in FIG. 4) and into a second position B (as shown in FIGS. 5 and 6). Preferably, the plate member 40 is substantially horizontal when in position A (the closed or "up" position) and non-contiguous with the bed extension 32 when in position B (the open or "down" position). It is also preferred that the plate member 40 be positioned substantially centered widthwise with respect to the trailer 1, as shown, in order to be properly positioned with doors, such as doors 15, 17, that are hinged on the outer sides of the trailer 1.

With continuing reference to FIGS. 3–6, when in position A the plate member 40 is properly positioned to receive the lock bars 16, 16. More specifically, the lock bars 16, 16 may be positioned within the openings 45, 46 and the doors 15, 17 are thereby prevented from being opened. When in position B the plate member 40 is properly positioned to permit the doors, with the lock bars 16, 16 extended downwardly, to swing or pivot open. After the swing doors 15, 17 have been opened, the plate member 40 may be returned to position A. Preferably, a locking means 47 is provided to allow for the locking of the plate member 40 in position A and in position B. In the preferred embodiment, the locking means 47 is a latch-and-catch design with a movable latch 48 that receives catch 62 in a manner well known in the art. However, any locking means 47 chosen with sound engineering judgment will work with this invention. Alternatively, two locking means may be provided, one to lock the plate member 40 in position A and another to lock the plate member 40 in position B.

With reference now to FIGS. 5–6, the preferred plate member 40 is pivotable about the bed extension 32 via pivot pins 50, 52. In the preferred embodiment, the pivot pins 50, 52 are bolts with corresponding nuts as shown. However, any pivot means that allows the plate member 40 to swing or pivot between positions A and B is suitable for this invention. Extensions 58, 60 may be fixedly attached to the plate member 40, such as by welding, as shown. Preferably, a number of rest or stop members 64, 66, 68, 70 are fixedly attached, preferably welded, to the bed extension 32. The rest members 68, 70 also serve the function of forming slots 54, 56 with the bed extension 32 as shown. The plate member 40 preferably includes holding means 61 to enable the operator to grasp or hold the plate member when moving the plate member 40 between position A and B. In the preferred embodiment, the holding means 61 includes a notch 63 cut out of the plate member 40 as shown.

With reference now to FIGS. 1 and 3–6, the operation of the invention will now be described. The doors 15, 17 may be in the closed and locked position as shown in FIGS. 1 and 3. The plate member 40 is simultaneously in position A, as shown in FIG. 4, and the lock bars 16, 16 are received in the openings 45, 46 as described above. To open the doors 15, 17, the operator first lifts the lock bars 16, 16 out of the receptacles 35, 35 and the openings 45, 46. The operator then grasps the holding means 61, preferably the edges of the notch 63, and pivots the plate member 40 about the pivot pins 50, 52 from position A to position B (shown in FIGS. 5 and 6). The doors 15, 17 can then be pivoted about hinges 18, 20 into an open position by the operator with the lock bars 16, 16 extending downwardly. Next, the operator grasps the holding means 61 and pivots the plate member 40 about the pivot pins 50, 52 from position B to position A (shown in FIG. 4). As the plate member 40 pivots from position B to position A the extensions 58, 60 are received within the slots 54, 56. When in position A, the plate member 40 rests on or is supported by the rest or stop members 64, 66, 68, 70. Optionally, the operator may lock the plate member 40 into the first position A with the locking means 47. The operator may now easily load and/or unload items from the trailer 1, using a liftgate 80, if desired. It should be noted that the notch 63 as well as the openings 45, 46 are sufficiently small to prevent the wheels from any dolly, cart, or other wheeled transport device from getting lodged or stuck. This is an improvement of the prior art and makes loading and unloading of the trailer 1 much easier.

With continuing reference to FIGS. 1 and 3–6, when it is desired to close the doors 15, 17, the operator grasps the holding means 61, preferably the edges of the notch 63, and pivots the plate member 40 about the pivot pins 50, 52 from position A to position B. The doors 15, 17 can then be pivoted about hinges 18, 20 into a closed position by the operator with the lock bars 16, 16 extending downwardly. Next, the operator grasps the holding means 61 and pivots the plate member 40 about the pivot pins 50, 52 from position B to position A. The operator then extends the lock bars 16, 16 into the receptacles 35, 35 and into the openings 45, 46.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

I claim:

1. A trailer system comprising:
   a trailer comprising: a trailer bed; at least a first door pivotally attached to the trailer; and, at least a first lock member operatively connected to the first door for use in preventing the first door from pivoting;
   a bed extension secured to the trailer that extends outwardly from the trailer bed beyond the pivotal attachment of the first door to the trailer; and,
   a plate member pivotally attached to the bed extension and selectively pivotable into: a first position A where the plate member, the trailer bed, and the bed extension form a continuous surface adapted to receive the wheels of a transport device and where the plate member selectively receives the first lock member; and, a second position B where the plate member does not form a continuous surface with the trailer bed and the bed extension and the first door can be pivoted into a closed position without the first lock member interfering with the plate member.

2. The trailer system of claim 1 wherein:
   the trailer further comprises a second door pivotally attached to the trailer and a second lock member operatively connected to the second door for use in preventing the second door from pivoting; and,
   when in the first position A the plate member selectively receives the second lock member and when in the second position B the second door can be pivoted into a closed position without the second lock member interfering with the plate member.

3. The trailer system of claim 1 further comprising:
   a liftgate having a platform that is selectively positionable to form a continuous surface with the bed extension and the trailer bed.

4. The trailer system of claim 1 wherein the plate member comprises:
   a first opening for receiving the first lock member.

5. The trailer system of claim 1 wherein the plate member comprises:
   holding means for use in holding the plate member when moving the plate member between First position A and second position B.

6. The trailer system of claim 1 wherein the bed extension comprises:
   at least a first stop member for use in supporting the plate member when the plate member is in the first position A.

7. The trailer system of claim 1 further comprising:
   a locking means for selectively locking the plate member in First position A.

8. The trailer system of claim 1 wherein the plate member is positioned substantially centered widthwise with respect to the trailer.

9. The trailer system of claim 1 wherein pivot means used to pivot the plate member is positioned substantially at an outer edge of the bed extension.

10. A device comprising:
    a bed extension adapted to be secured to an associated trailer having a trailer bed and at least a first door pivotally attached to the trailer with at least a first hinge and at least a first lock member operatively connected to the first door for use in preventing the first door from pivoting, the bed extension extends outwardly from the trailer bed beyond the first hinge; and,
    a plate member pivotally attached to the bed extension and selectively pivotable into: a first position A where the plate member, the trailer bed, and the bed extension form a continuous surface adapted to receive the wheels of a transport device and where the plate member is adapted to selectively receive the first lock member; and, a second position B where the plate member does not form a continuous surface with the trailer bed and the bed extension and the first door can be pivoted into a closed position without the first lock member interfering with the plate member.

11. The device of claim 10 wherein the plate member comprises:
    a first opening for receiving the first lock member.

12. The device of claim 10 wherein the plate member comprises:
    holding means for holding the plate member when moving the plate member between First position A and second position B.

13. The device of claim 10 wherein the bed extension comprises:
    at least a first stop member for use in supporting the plate member when the plate member is in the first position A.

14. The device of claim 10 further comprising:
    a locking means for selectively locking the plate member in First position A.

15. The device of claim 10 wherein pivot means used to pivot the plate member is positioned substantially at an outer edge of the bed extension.

16. A method comprising the steps of:
    providing a trailer having a trailer bed, a first door pivotally attached to the trailer and a first lock member operatively connected to the first door for use in preventing the first door from pivoting;
    providing a bed extension secured to the trailer that extends outwardly from the trailer bed beyond the pivotal attachment of the first door to the trailer, the bed extension including a plate member pivotally attached to the bed extension;

unlocking the first lock member;

pivoting the plate member from a first position A where the plate member, the trailer bed, and the bed extension form a continuous surface adapted to receive the wheels of a transport device to a second position B where the plate member does not form a continuous surface with the trailer bed;

pivoting the first door into an open position without the first lock member interfering with the plate member; and, pivoting the plate member from the second position B to the first position A.

17. The method of claim 16 wherein the step of pivoting the first door into an open position without the first lock member interfering with the plate member, comprises the step of:

permitting the first lock member to extend downwardly from the first door.

18. The method of claim 16 further comprising the step of:

locking the plate member into the first position A.

19. The method of claim 16 further comprising the steps of:

pivoting the plate member from the first position A to the second position B;

pivoting the first door into a closed position; and, pivoting the plate member from the second position B to the first position A.

20. The method of claim 19 further comprising the step of:

placing the first lock member within an opening in the plate member.

\* \* \* \* \*